(No Model.)

A. DE F. SPERRY.
COMBINATION PLOW AND HARROW.

No. 604,274.  Patented May 17, 1898.

WITNESSES
Arthur Ashley
Victor J. Evans

INVENTOR,
Arthur DeForest Sperry.
by John Wedderburn.
Attorney

UNITED STATES PATENT OFFICE.

ARTHUR DE FOREST SPERRY, OF HAMILTON, MONTANA.

COMBINATION PLOW AND HARROW.

SPECIFICATION forming part of Letters Patent No. 604,274, dated May 17, 1898.

Application filed August 28, 1897. Serial No. 649,854. (No model.)

*To all whom it may concern:*

Be it known that I, ARTHUR DE FOREST SPERRY, of Hamilton, in the county of Ravalli and State of Montana, have invented certain new and useful Improvements in a Combination Plow and Harrow; and I do hereby declare the following to be a full, clear, and exact description of the invention, such as will enable others skilled in the art to which it appertains to make and use the same.

My invention relates to new and useful improvements in a combined plow and harrow; and it consists in the novel combination and arrangement of simple parts that will be hereinafter fully described.

The object of the invention primarily is to provide a plow and harrow combined in such a manner that the harrow can be used or not, as desired, when not in use will occupy little space, and will not in any way interfere with the operation of the plow.

A further object of the invention is to so connect the plow and harrow that the same will have independent motion of the plow when necessary.

A still further object is to provide a device of the character mentioned that will be especially simple in construction, economical, durable, and efficient in operation.

I am enabled to accomplish the object of my invention by the simple means illustrated in the accompanying drawings, in which—

Figure 1:
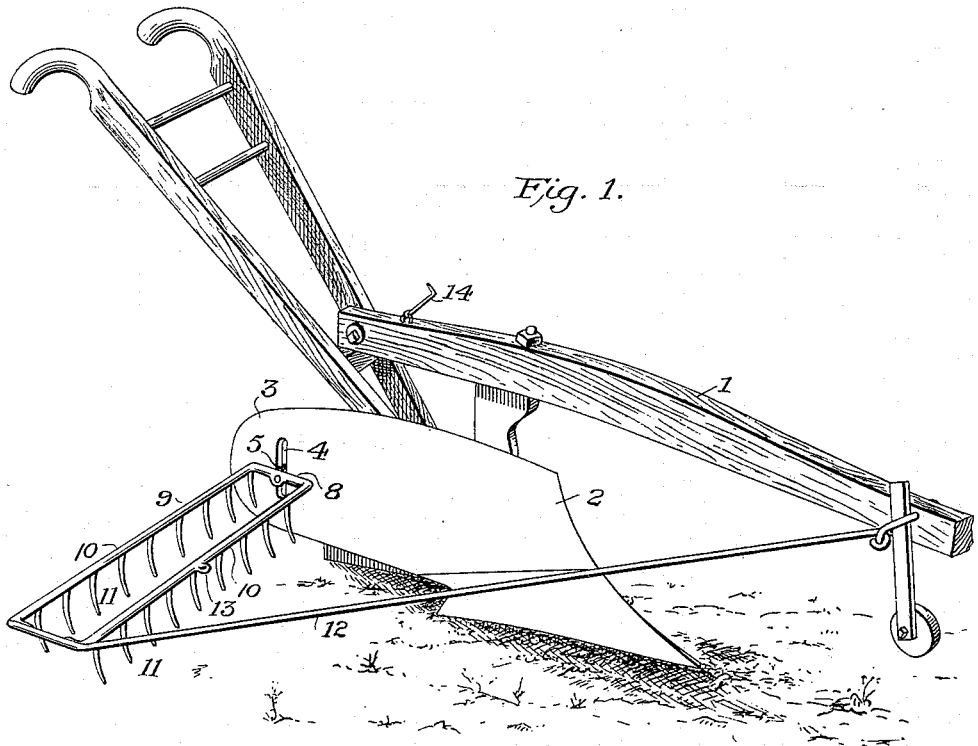
Figure 2:
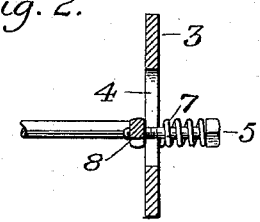

Figure 1 represents a perspective view of my improved harrow and plow. Fig. 2 is a transverse section of the rear portion of the turning-board of the plow and harrow.

Referring to the drawings, numeral 1 indicates the beam of a plow of ordinary construction, and the numeral 2 designates the turning-board thereof, which in the present instance is preferably made a little longer than usual, thus providing a rearward extension 3, which is provided with the vertical slot 4, through which extends a bolt 5, provided on the inner side of the turning-board with a head, between which and the side of the turning-board is interposed a strong spiral spring 7, and said bolt extends through the slot, where, on the outer side of said slot, it is firmly secured to the cross-bar 8 of a harrow 9, formed in the present instance of two parallel bars or beams 10, provided with teeth 11, the teeth in one bar being adapted to come opposite the spaces between the teeth of the other bar. Firmly secured to the outer ends of the harrow-bars is the bar 12, which extends obliquely from the harrow of the forward end of the bar, where it is connected in such a manner as to permit the bar to turn so that it can be lifted from the ground when desired, and when the harrow is so lifted the eye 13 is provided near the center of the forward harrow-bar, which is adapted to be engaged by the hook 14, provided upon the rear portion of the beam-plow. Thus it will be seen that the harrow will be supported out of contact with the ground either for the purpose of going from one field to the other with the plow and harrow or for using the plow independently from the harrow.

It will be observed that due to the shape of the slot in the rear portion of the turning-board the harrow will have a vertical movement, thus enabling it to accommodate itself to the movements of the plow when the same is running "deep" or "shallow."

It will further be observed that the spring interposed between the head of the bolt and the side of the turning-board will permit lateral movement on the part of the harrow, thus making the harrow independent of the plow in its lateral movements in the furrow.

In the foregoing description it will be noted that the device herein described is especially simple in construction and that it can be manufactured at a very low figure.

Having thus described my invention, what I claim as new, and desire to secure by Letters Patent, is—

1. The combination with a plow having a vertical or approximately vertical slot in the turning-board thereof, of a harrow having a projection extending through said slot, means for securing the projection in said slot so that the same will have vertical movement therein, and suitable braces between the plow-beam and the harrow, substantially as and for the purpose set forth.

2. In a combined plow and harrow, the combination with a plow having a vertical or approximately vertical slot in the rear portion of the turning-board thereof, of a harrow provided with an extension passing through said slot, said extension being provided with a head or stop to secure the harrow to the turning-board and permit the same to have vertical movement in the slot therein, a spring interposed between the head or stop and the turning-board to permit independent lateral movement of the harrow, and suitable braces between the harrow and the plow-beam, substantially as and for the purpose set forth.

3. In a device of the character described, the combination with a plow having a vertical or approximately vertical slot in the turning-board thereof, of a harrow provided with an extension passing through said slot, said extension being provided with a head or stop on the other side of the turning-board to secure the harrow to the same and permit vertical movement in the slot, a spring interposed between the head or stop and the turning-board of the plow to permit lateral movement of the harrow, a rod secured to the harrow and extending to the beam of the plow, said rod having a pivoted connection with said beam, so that the said plow and harrow can be rocked upwardly, and means for securing or holding the harrow in elevated position, substantially as and for the purpose set forth.

4. In a device of the character described, the combination with a plow having a turning-board provided with a rearward extension having a vertical or approximately vertical slot therein, of a harrow provided with a projection, extending through said slot and provided with a head or stop to secure the harrow to the turning-board and permit the same to have vertical movement in said slot, a spring interposed between said slot and the turning-board to permit lateral movement to the harrow, braces between the plow-beam and the harrow, said harrow being adapted to be lifted out of contact with the ground, and the means for holding said harrow in elevated position, substantially as and for the purpose set forth.

In testimony whereof I have signed this specification in the presence of two subscribing witnesses.

ARTHUR DE FOREST SPERRY.

Witnesses:
SYDNEY EDWARDS,
W. A. THORNING.